May 10, 1960

O. J. LEINS 2,936,125

THERMOSTATIC CONTROL DEVICE

Filed March 14, 1956

INVENTOR.
Oscar J. Leins,
BY

United States Patent Office 2,936,125
Patented May 10, 1960

2,936,125

THERMOSTATIC CONTROL DEVICE

Oscar J. Leins, Milwaukee, Wis., assignor, by mesne assignments, to Minnesota Mining and Manufacturing Company, St. Paul, Minn., a corporation of Delaware Application March 14, 1956, Serial No. 571,520

4 Claims. (Cl. 236—68)

This invention relates, in general, to temperature controlling means, and has particular relation to a thermostatic control device for regulating temperature, for example, by controlling the operation of heating or cooling means for enclosed spaces such as rooms and the like.

While I shall describe herein, in connection with the drawing, particular devices and particular uses of the same, it is to be understood that the present invention in its broader aspects is not limited to these particular forms of devices, nor to the particular uses which will be described, but may be embodied in other forms of devices and employed for all similar or equivalent purposes as suitable or desired.

By way of one example, the ordinary heating system has such a lag that heat will continue to be supplied after the burner or other heater operation has been terminated. If the heater is maintained in operation solely in accordance with room temperature, there will be an excessive overshooting of the temperature. Moreover, because of the lag of the thermostat sensing room temperature, the latter will drop below the point at which the thermostat is set before the heater operation is again initiated.

In prior practice, it is known to associate with the thermostat a heater which is adapted locally to heat the thermostat to cause it to cease calling for heat slightly before it would by reason of the rise in ambient temperature. The purpose of these prior devices has been to prevent overshooting of the temperature. In other words, they have acted as heat anticipators for anticipating the temperature for which the thermostat is set and terminating the operation of the heater before it would be terminated by the rise in ambient temperature, so that any continued supply of heat after the heater operation is terminated will merely bring the temperature up to that for which the thermostat is set. These prior schemes employ an electrical resistance or resistor for locally heating the thermostat for heating anticipation.

However, there has been no means known to the prior art for anticipating the thermostat setting upon decrease in ambient temperature in order to further narrow the fluctuations in room temperature for a given thermostat setting. Without such cold anticipation the air in the space or other medium, the temperature of which it is desired to control, may become cooler than that for which the thermostat is set.

One of the main objects of the present invention is to provide a thermostatic control device having both heating and cooling anticipation, i.e., a device having means which will give off heat to the thermostat to cause it to cease calling for heat before it would by reason of a rise in ambient temperature and which will also absorb heat from the thermostat to cause it to call for heat before it would by reason of a drop in ambient temperature.

Another object of the invention is to provide an improved temperature anticipator employing the Peltier effect which is accomplished in the new combination and with the new results set forth by combining with the thermostat thermoelectric heat pump means joined to form one or more junctions and utilizing the production and/or absorption of heat at the one or more junctions by the passage of an electric current in one or opposite directions through the thermoelectric heat pump means to change the temperature of the thermostat.

Another object of the invention is to provide a device of the class described wherein the thermostat and the thermoelectric heat pump means are in good heat transfer relation, for example, are enclosed within a sealed envelope or container, and, more particularly, wherein one or more junctions of the thermoelectric heat pump means are disposed within the envelope or container with one or more other junctions disposed outside the container.

Another object of the invention is to provide a device of the class described, wherein the envelope or container housing the thermostat and the thermoelectric heat pump means is filled with a light gas which will conduct heat rapidly, and, more particularly, wherein the wall of the envelope or container may be thin and of good heat conducting properties.

Another object of the invention is to provide an improved thermostat and thermoelectric heat pump means, and, more particularly, an improved capsulated thermostat and thermoelectric heat pump means which will function as an exceedingly sensitive instrument and which may be made of very small, compact, simple and relatively inexpensive construction.

Other objects and advantages of the invention, and numerous adaptations of the invention will be apparent from the following detailed description and the accompanying drawings.

In the drawings:

Figure 1 is a diagrammatic view of an embodiment of the invention;

Figure 2 is a graphic illustration of semi-metallic lead-selenium-tellurium compositions which may be used as thermoelectric heat pump elements in my invention; and Figure 3 is a graphic illustration of semi-metallic lead-selenium-sulphur compositions which may be used as thermoelectric heat pump elements in my invention.

Referring first to the embodiment of the invention shown in Figure 1, a temperature responsive member 1 and heat pump means 2 are enclosed within a sealed envelope 3 provided with an insulating base 4.

The temperature responsive member 1 is shown in the form of a bimetallic member comprising two strips 5 and 6 of different metals or other thermostat materials, such, for example, as brass and steel securely fastened together. One end of the temperature responsive member 1 is fixed, for example, at 7 to the base 4, and the other end of the temperature responsive member carries a contact 8 which moves by the action of the temperature responsive member into and out of engagement with a cooperating contact 9 which is also located within the envelope 3. It is to be understood, however, that other forms of bimetallic temperature responsive members may be employed in the thermostatic control device of the present invention, and that in the broader aspects of the invention the thermostat may be of other than bimetallic form, one example being a vapor filled bellows.

Where the device of my invention is adapted for controlling a heating device, for example, it is arranged so that upon a temperature increase it will move contact 8 out of engagement with contact 9, and, upon a decrease in temperature, the contact 8 will be moved into engagement with contact 9. On the other hand, if the thermostat is to control a cooling device, it may be arranged so that upon a decrease in temperature it will move contact 8 out of engagement with contact 9, and upon an increase in temperature the thermostat will move contact 8 into engagement with contact 9.

The fixed end of temperature responsive member 1 is connected in circuit with a contact terminal 10 shown, for example, in the form of a contact prong extending outwardly from the base 4. A second contact terminal 11, also shown, for example, in the form of a second contact prong extending outwardly from the base 4, is connected in circuit with the contact 9 by a lead conductor or conductive connection 12 disposed within the envelope 3.

The heat pump means 2 comprises thermoelectric heat pump element 14, which may be composed of compositions to be hereinafter described, connected at opposite ends to metallic circuit members 13 and 19 and forming therewith junctions 15 and 17, respectively. As will presently appear, the thermoelectric heat pump element 14, and junctions 15 and 17, respectively, are such as to utilize the Peltier effect to pump heat through the thermoelectric heat pump element 14 to afford heat absorption at the junction 17 and heat generation at the junction 15 when a direct current is passed therethrough in one direction and to effect heat absorption at the junction 15 and heat generation at the junction 17 when such current is reversed.

The thermoelectric heat pump element 14 may be of any suitable material exhibiting a high Peltier coefficient, low thermal conductivity, and low electrical resistivity. More specifically, the thermoelectric heat pump element 14 may be of the materials disclosed in the copending patent application of Robert W. Fritts and Sebastian Karrer, Serial No. 512,436, filed June 1, 1955, now Patent No. 2,896,005. Such materials are semi-metallic alloys or compositions which may be characterized as binary metallic compounds of slightly imperfect composition, i.e., containing beneficial impurities constituting departures from perfect stoichiometry by reason of an excess of one of the metals over the other, and/or containing added beneficial impurity substances denominated hereinafter "promoters." Such semi-metallic compositions have semiconductor-like conductance (both electrical and thermal, as aforementioned). Semi-metallic alloys or compositions also include mixtures of such binary metallic compounds, which may be denominated ternary metallic alloys or compositions.

More specifically, the thermoelectric heat pump element 14 may comprise lead and at least one member of the group tellurium, selenium, and sulphur in proportions hereinafter described and to which may be added beneficial impurity substances in the form of promoters, as will also hereinafter be described. As will appear, certain of these alloys or compositions of the application above referred to, exhibit negative and certain exhibit positive electrical characteristics thereby affording, if desired, a compound or double heat pump unit of increased efficiency.

Referring now to Figure 2, there are graphically illustrated therein a multiplicity of examples of semi-metallic compositions or alloys for thermoelectric heat pump elements comprising lead and tellurium and selenium of the aforementioned application. It will be observed that the horizontal coordinate of this graph represents the various proportions of tellurium and selenium given in atomic percent and ranging linearly from tellurium containing but a "trace" (as hereinafter defined) of selenium on the left to selenium containing but a "trace" of tellurium on the right. The left-hand vertical scale (in terms of percent by weight) gives the amount of lead which can be alloyed with the tellurium, selenium or tellurium-selenium constituent for any proportions of the latter while the right-hand vertical scale conversely gives the percent by weight of the tellurium, selenium or selenium-tellurium constituent for any proportions of the latter in the final composition, the remainder, of course, being lead.

Figure 2 graphically illustrates compositions or alloys comprising lead and either tellurium or selenium or both since, as disclosed in the aforementioned application, selenium and tellurium when alloyed with lead within the proportions indicated are mutually soluble throughout the range of compositions illustrated and that tellurium and selenium are interchangeable for purposes of providing suitable thermoelectric heat pump elements falling within the class of binary metallic compounds aforementioned, and due to such mutual solubility, such binary compounds of the constituents indicated may be mixed, as is also graphically illustrated, to provide the ternary alloys or compositions also hereinbefore mentioned.

Referring now to Figure 3, there are graphically illustrated therein a further multiplicity of examples of semi-metallic compositions or alloys for thermoelectric heat pump elements comprising lead and selenium or sulphur. As is the case in Figure 2, the horizontal coordinate of the graph of Figure 3 represents the various proportions of selenium and sulphur given in atomic percent and ranging linearly from selenium containing but a trace of sulphur on the left to sulphur containing but a trace of selenium on the right. The left-hand vertical scale (in terms of percent by weight) gives the amount of lead which can be alloyed with the selenium, sulphur or selenium-sulphur constituent for any proportions of the latter, while the right-hand vertical scale conversely gives the percent by weight of the sulphur, selenium, or selenium-sulphur constituent for any proportions of the latter in the final composition, the remainder, of course, being lead.

Figure 3 further graphically illustrates compositions or alloys comprising lead and either selenium or sulphur or both, since selenium and sulphur when alloyed with lead within the proportions indicated are mutually soluble throughout the range of compositions illustrated and that selenium and sulphur are interchangeable for purposes of providing suitable thermoelectric heat pump elements falling within the class of binary metallic compounds aforementioned, and due to such mutual solubility such binary compounds of the constituents indicated may be mixed as is also illustrated to provide the ternary alloys or compositions also hereinbefore mentioned.

If it is desired to increase the production and absorption of heat by the heat generating and absorbing device 2, this device may comprise a plurality of thermoelectric heat pump elements connected in series with the junctions corresponding to the junction 15 disposed within the envelope 3 in appropriate relation to the temperature responsive member.

In the device shown in Figure 1 the element 13 constitutes the conductive connection 16 to the contact 9, but this may vary. The element 14 preferably extends, for example, through the base 4 to position outside the envelope 3 to dispose the junction 17 between this element and the circuit designated in its entirety at 18 outside the envelope 3 where it will not be subject to heat generated at junction 15, or to absorption of heat by junction 15. The outwardly projecting end of element 14 may constitute a third terminal prong, in which case it may be plated, if desired, or a terminal prong 19 of different metal or conductive material may be brazed, welded, or otherwise suitably joined to the outwardly projecting end of element 14 to form the third terminal prong.

The circuit, designated in its entirety at 18, may vary widely within the scope of the present invention. The particular circuit shown in Figure 3 comprises a relay 20 which comprises a coil 21, movable switch arms 22, 23, and 24, and fixed contacts 25, 26, and 27.

The device indicated at 28, which may be a heater, or it may be a cooling device, has conductive connection at 29 with contact 25, and another conductive connection 30, for example, with a suitable source of power (not shown). The other line wire or other side of the source of power has conductive connection at 31 with the switch arm 22.

The switch arm 23 has conductive connection 32 with the contact terminal 11 of the thermostatic control device through a resistance 32' in circuit with the connection 32. The coil 21 has one end connected to the contact terminal 10 by a conductive connection 33. The opposite end of coil 21 is connected by a conductive connection 34 to one side of a D.C. source of current 35. The contact 26 has conductive connection 36 with the contact terminal 19 through a resistance 37, and, if desired, through the resistance 38 of a potentiometer having a sliding contact 39. In such case the sliding contact 39 is connected by a conductive connection 40 to the switch arm 24, and contact 27 is connected by a conductive connection 41 to the conductor 34. The other side of the D.C. source of current 35 has conductive connection 42 with the conductor 36, preferably with the resistances 37 and 38 disposed between the contact terminal 19 and the connection of connector 42 with conductor 36.

The circuit 18 may have a socket or other type of terminal connector provided with contacts connected to conductors 32, 33, and 36, and adapted for quick detachable contact with contact prongs 11, 10, and 19 of the thermostatic control device when the contact prongs are applied to the circuit outlet or connector. In such case the contact prongs may be of different diameters, or otherwise formed or arranged to permit engagement with the circuit contacts only in the desired relation.

The sealed envelope 3 is preferably filled with relatively light gas of a character to conduct heat rapidly. Helium and hydrogen are suitable gases, but any light gas that conducts heat rapidly may be employed. The wall of the envelope 3 is preferably a thin copper wall, or thin wall of other good conducting material. These features, with the capsulated heat generating and absorbing device, and low mass capsulated thermostat, provide an extremely sensitive device. It is to be understood, however, that the invention in its broader aspects does not require that the elements be capsulated.

With the thermostatic control device and circuit arrangement shown in Figure 1, and assuming that element 14 is formed, for example, of any one of the aforementioned negative semi-metallic compositions, when contacts 8 and 9 are closed electric current will flow from the positive side of the source of current 35 through conductor 34, coil 21, conductors 33, temperature responsive member 1, contacts 8 and 9, conductor 13, thermoelectric heat pump means 2, resistances 38 and 37, and conductor 42 to the negative side of source 35. In this circuit, current flow will be downward through the thermoelement 14 of the heat generating and absorbing device. The thermoelectric heat pump means 2 at this time generates heat at the junction 15, which heat is given off to the temperature responsive member 1 to cause it to warp in a direction to separate contact 8 from contact 9 before it would it would be separated from contact 9 by heat produced, for example, by the device 28 where this device is a heater. The device 2 thus functions at this time to prevent overshooting the upper temperature limit for which the thermostat is set. Should the element 14 be a positive thermoelectric element, fabricated for example of any of the aforementioned positive compositions, the aforedescribed circuit connections to the direct current source 35 would of course be reversed to achieve the aforementioned heating at junction 15.

With the contacts 8 and 9 closed, the energization of coil 21 moves switch arm 22 into closed position engaging contact 25, and switch arms 23 and 24 into open positions separated from contacts 26 and 27. With switch arm 22 in engagement with contact 25, electric current or power passes from one side of the source of power (not shown) through conductors 30, device 28, conductor 29, contact 25, switch arm 22, and conductor 31 to the other side of the source of power. Where the device 28 is a heater, it will now operate to heat the room or other space or medium to the temperature to which the thermostatic control device is responsive, for example, by positioning it therein.

As the temperature of the room, space, or medium approaches, by reason of the heat supplied by the heater 28, the temperature for which the thermostat 1 is set, the heat supplied locally by the junction 15 of the heat generating and absorbing device 2 will cause the temperature responsive member 1 to separate contact 8 from contact 9 before it would be separated solely by change in temperature produced by the heater 28.

When contacts 8 and 9 are opened, as shown in the drawing, the coil 21 will be deenergized, and, at this time, switch arm 22 will move to open circuit position and switch arms 23 and 24 will move to their closed circuit positions. The separation of switch arm 22 from contact 25 opens the circuit for the heater 28, and thereby terminates the operation of the heater.

At this time, in the illustrated embodiment, current will flow from the positive side of source 35 through conductor 41, contact 27, switch arm 24, conductor 40, sliding contact 39 of the potentiometer, through the elements 14, 13 in an upward or reversed direction, through conductor 12, resistance 32', switch arm 23, contact 26, and conductors 36 and 42, back to the negative side of the D.C. source of current 35. This reversal of current through the thermoelectric heat pump means 2 will cause the junction 15 to absorb heat from the thermostat to provide cold anticipation. In other words, as the room, space, or medium, to the temperature of which the thermostatic control device 1 is responsive, cools with the heater 28 out of operation, the heat absorbed at junction 15 will cause the temperature responsive member 1 to engage contact 8 with contact 9 and thereby start the heater 28 in operation before it would solely by a drop in the temperature produced by the heater 28. The device 2 thus functions at this time to prevent undershooting of the lower temperature limit for which the thermostat is set.

Where the device 28 is a cooling device instead of a heating device, then the elements of the device 2 and the thermostat 1 and contacts are turned around so that the above indicated heating and cooling functions are reversed. In other words, where the device 28 is a cooling device, the thermoelectric heat pump means 2 will be arranged to absorb heat from the thermostat at the upper limit for which it is set, and to give off heat to the thermostat at the lower limit for which the thermostat is set.

The potentiometer, comprising resistance 38 and sliding contact 39, provides for varying the heat generating or heating effect and the heat absorbing or cooling effect of the thermoelectric heat pump means 2, and thereby the effective range of the thermostat 1. Hence, it will be apparent that within this broad concept, remote adjustment of a thermostat may be obtained, and for application purposes the thermostat and device 2 and their capsule may be placed, for example, in the ceiling of a space the temperature of which is to be controlled, and the potentiometer may be placed at a convenient wall location for adjusting the thermostat 1.

Variance of the resistances 37 and 32' may be linked, if desired, to provide for adjustment. However, it is preferable that resistances 37 and 32' only be adjusted for sensitivity control or differential. It is preferable that resistances 37 and 32' be incorporated quite a distance away from the temperature responsive member 1. For example, it may be well to incorporate resistances 37 and 32' in a control box which may contain the relay 20 and may be quite remote from the member 1.

While in the embodiment of the invention shown and described the thermostat and thermoelectric heat pump means are shown and described as capsulated in a sealed envelope or capsule, it is to be understood that the invention, particularly in its broader aspects, may be incorporated in a device wherein these parts are not capsulated. Where the parts are capsulated as described, oxidation and arcing at the capsulated parts may be avoided in addition to obtaining the other advantageous results set forth.

The embodiment of the invention shown in the drawing is for illustrative purposes only, and it is to be expressly understood that said drawing and the accompanying specification are not to be construed as a definition of the limits or scope of the invention, reference being had to the appended claims for that purpose.

I claim:

1. A thermostat adapted to be responsive to the temperature of a given medium comprising temperature responsive switch means having a temperature sensing element adapted to be subjected to the temperature of the medium to which said thermostat is to be responsive, and circuit controlling contacts having a first position in which they are disposed when said thermostat is calling for a change in medium temperature in one sense and having a second position in which they are disposed when said thermostat is not calling for said change in medium temperature, and anticipation means comprising thermoelectric heat pump means having thermojunction means in heat transfer relation with said temperature sensing element adapted to be subjected to the temperature of said medium, said heat pump means being operable to afford auxiliary heating or cooling at said temperature sensing element in accordance with the polarity of energizing current supplied thereto for varying, from the temperature of said medium, the temperature to which said temperature sensing element is subjected, and means under control of said switch means for supplying to said heat pump means energizing current of one polarity when said contacts are disposed in their said first position and of the opposite polarity when said contacts are disposed in their said second position.

2. A thermostat according to claim 1 in which the temperature sensing element has a contact actuating portion movable in response to variations in the temperature sensed by said element.

3. A thermostat according to claim 1 in which said temperature responsive switch means is mounted on an insulating base and said thermoelectric heat pump has thermoelement means extending through said insulating base and joined at one end to said thermojunction means adjacent said temperature sensing element.

4. A thermostat according to claim 1 in which said contacts are in their said first position when the thermostat is calling for heat and in which said heat pump is energized by current of a polarity to effect auxiliary heating of the temperature sensing element when said contacts are in their said first position.

References Cited in the file of this patent

UNITED STATES PATENTS

| | | |
|---|---|---|
| 484,182 | Dewey | Oct. 11, 1892 |
| 1,269,269 | Faltermayer | June 11, 1918 |
| 1,718,749 | Marshall | June 25, 1929 |
| 1,741,601 | Appelberg | Dec. 31, 1929 |
| 1,812,722 | Spencer | June 30, 1931 |
| 1,969,955 | Thomas | Aug. 14, 1934 |
| 1,997,559 | Hajek | Apr. 9, 1935 |
| 2,148,491 | Moore | Feb. 28, 1939 |
| 2,232,998 | Cernohouz et al. | Feb. 25, 1941 |
| 2,274,399 | Cook | Feb. 24, 1942 |
| 2,766,937 | Snavely | Oct. 16, 1956 |